(12) United States Patent
Hayashi et al.

(10) Patent No.: US 9,405,125 B2
(45) Date of Patent: Aug. 2, 2016

(54) IMAGE DISPLAY APPARATUS

(71) Applicant: PANASONIC CORPORATION, Osaka (JP)

(72) Inventors: Katsuhiko Hayashi, Nara (JP); Masahiro Kasano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/276,828

(22) Filed: May 13, 2014

(65) Prior Publication Data

US 2014/0247211 A1  Sep. 4, 2014

Related U.S. Application Data

(63) Continuation of application No. PCT/JP2012/007224, filed on Nov. 12, 2012.

(30) Foreign Application Priority Data

Nov. 16, 2011 (JP) ................................. 2011-251121

(51) Int. Cl.
*G02B 27/22* (2006.01)
*G09F 9/35* (2006.01)
(Continued)

(52) U.S. Cl.
CPC ........ *G02B 27/2214* (2013.01); *G02B 27/0093* (2013.01); *G02B 27/2264* (2013.01); *G02F 1/1323* (2013.01); *G02F 1/1347* (2013.01); *G06F 3/005* (2013.01); *G09F 9/35* (2013.01); *G09F 19/14* (2013.01);
(Continued)

(58) Field of Classification Search
USPC .......................................................... 345/156
See application file for complete search history.

(56) References Cited

U.S. PATENT DOCUMENTS 5,943,166 A * 8/1999 Hoshi et al. .................... 359/475
6,169,594 B1   1/2001 Aye et al.
(Continued)

FOREIGN PATENT DOCUMENTS

JP     07-098439 A    4/1995
JP     11-234705 A    8/1999
(Continued)

OTHER PUBLICATIONS

International Search Report issued in International Application No. PCT/JP2012/007224 with Date of mailing Dec. 11, 2012.

*Primary Examiner* — Alexander Eisen
*Assistant Examiner* — Kebede Teshome
(74) *Attorney, Agent, or Firm* — McDermott, Will & Emery LLP (57) ABSTRACT

An image display apparatus capable of ensuring a wide view range is provided. The image display apparatus includes: an image display panel; a backlight located on a back surface side of the image display panel; prisms located between the image display panel and the backlight and configured to deflect incident light; a liquid crystal layer located between the image display panel and the backlight and configured to change a deflection direction of emitted light by changing a refractive index thereof according to a voltage applied thereto; a position detection section configured to detect a position of a user; and a control section configured to control the voltage applied to the liquid crystal layer, on the basis of information of the position of the user detected by the position detection section.

20 Claims, 9 Drawing Sheets (51) Int. Cl.
*G09F 19/14* (2006.01)
*G02F 1/13* (2006.01)
*G02F 1/1347* (2006.01)
*H04N 13/04* (2006.01)
*G02B 27/00* (2006.01)
*G06F 3/00* (2006.01)

(52) U.S. Cl.
CPC ...... *H04N 13/0411* (2013.01); *H04N 13/0413* (2013.01); *H04N 13/0468* (2013.01)

(56) References Cited

U.S. PATENT DOCUMENTS

| | | |
|---|---|---|
| 2005/0276071 A1 | 12/2005 | Sasagawa et al. |
| 2009/0003001 A1* | 1/2009 | Ohta et al. ............... 362/339 |
| 2010/0027083 A1 | 2/2010 | Kroll et al. |
| 2010/0157026 A1* | 6/2010 | Reichelt ................... 348/51 |
| 2011/0090413 A1* | 4/2011 | Liou ........................ 349/15 |
| 2012/0154450 A1* | 6/2012 | Aho et al. ................ 345/690 |
| 2012/0287037 A1* | 11/2012 | Shikii et al. ............. 345/156 |
| 2013/0107340 A1* | 5/2013 | Wong et al. ............. 359/222.1 |

FOREIGN PATENT DOCUMENTS

| | | |
|---|---|---|
| JP | 2002-523802 A | 7/2002 |
| JP | 2006-293106 A | 10/2006 |
| JP | 2010-507823 A | 3/2010 |
| WO | 2004/027492 A1 | 4/2004 |

\* cited by examiner

41 CELL STRUCTURE

CELL STRUCTURE

IMAGE DISPLAY APPARATUS

CROSS-REFERENCE TO RELATED APPLICATION

This application is a Continuation of International Application No. PCT/JP2012/007224, filed on Nov. 12, 2012, which claims priority of Japanese Application No. 2011-251121, filed on Nov. 16, 2011, the disclosures of which Applications are incorporated by reference herein.

BACKGROUND

1. Field

The present disclosure relates to an image display apparatus such as a liquid crystal display.

2. Description of the Related Art

In recent years, display apparatuses capable of displaying stereoscopic images have been popularized. For example, Japanese Laid-Open Patent Publication No. 2006-293106 discloses a stereoscopic image displaying apparatus including an image display unit, a lenticular lens, and a prism sheet. More specifically, in Japanese Laid-Open Patent Publication No. 2006-293106, display light is deflected in an oblique direction (toward a user) as viewed from the stereoscopic image displaying apparatus so that the user can view an image, with a satisfactory image quality, displayed on a screen of the stereoscopic image displaying apparatus that is installed with the screen being substantially horizontal.

SUMMARY

The present disclosure provides an image display apparatus capable of ensuring a wide view range.

An image display apparatus according to the present disclosure includes: an image display panel; a backlight device located on a back surface side of the image display panel; a first optical element located between the image display panel and the backlight device and configured to deflect incident light; a second optical element located between the image display panel and the backlight device and configured to change a deflection direction of emitted light by changing a refractive index thereof according to a voltage applied thereto; a position detection section configured to detect a position of a user; and a control section configured to control the voltage applied to the second optical element, on the basis of information of the position of the user detected by the position detection section. The first optical element and the second optical element constitute a liquid crystal prism element. In the liquid crystal prism element, the first optical element is composed of a plurality of prisms each having a triangular cross section and a ridge line extending in a first direction parallel to one side of the image display panel, and the prisms are arranged between a pair of opposing substrates so as to be aligned in a second direction orthogonal to the first direction. In the liquid crystal prism element, the second optical element is composed of a liquid crystal element which includes a liquid crystal layer formed between the plurality of the prisms and one of the opposing substrates, and electrodes provided on inner surfaces of the opposing substrates, and is configured to generate an electric field in a thickness direction thereof when a voltage is applied. The liquid crystal prism element is divided into a first region and a second region which are adjacent to each other in the second direction, and the cross sectional shape of each prism provided in the first region and the cross sectional shape of each prism provided in the second region are symmetrical to each other about a plane that is orthogonal to a display surface of the image display panel and passes through a boundary between the first region and the second region.

The image display apparatus according to the present disclosure is effective in achieving a sufficient view angle as compared to the conventional art.

DETAILED DESCRIPTION

Hereinafter, an embodiment will be described in detail with appropriate reference to the drawings. It is noted that a more detailed description than need may be omitted. For example, the detailed description of already well-known matters and the overlap description of substantially same configurations may be omitted. This is to avoid an unnecessarily redundant description below and to facilitate understanding of a person skilled in the art. Furthermore, in the drawings, principal components may be schematically illustrated for easy understanding.

It is noted that the inventors provide the accompanying drawings and the following description in order that a person skilled in the art may fully understand the present disclosure, and do not intend to limit the subject matter defined by the claims.

<Overall Configuration of Image Display Apparatus 1>

Figure 1A:
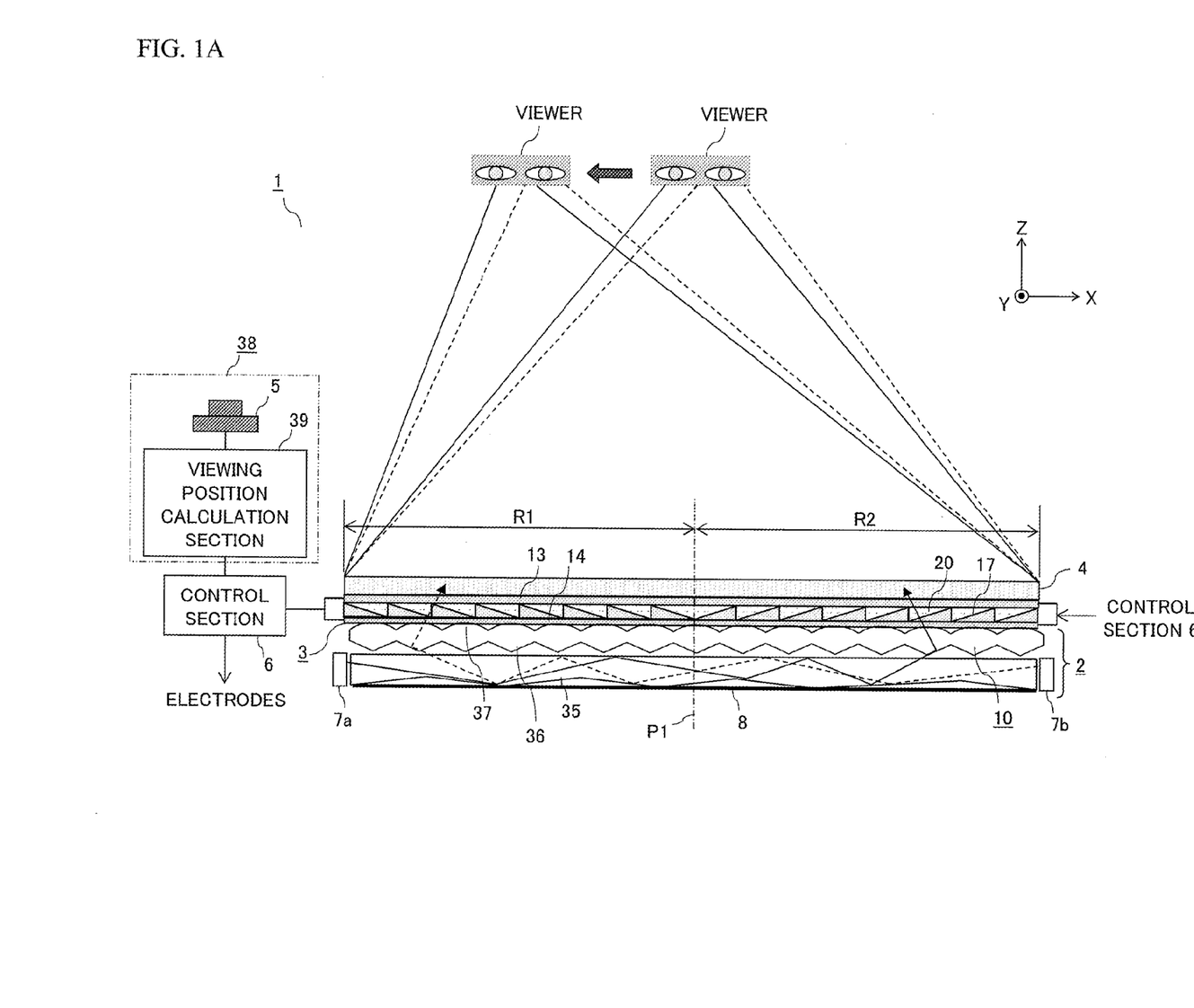
FIG. 1A is a schematic configuration diagram showing an image display apparatus according to an embodiment.
Figure 1B:
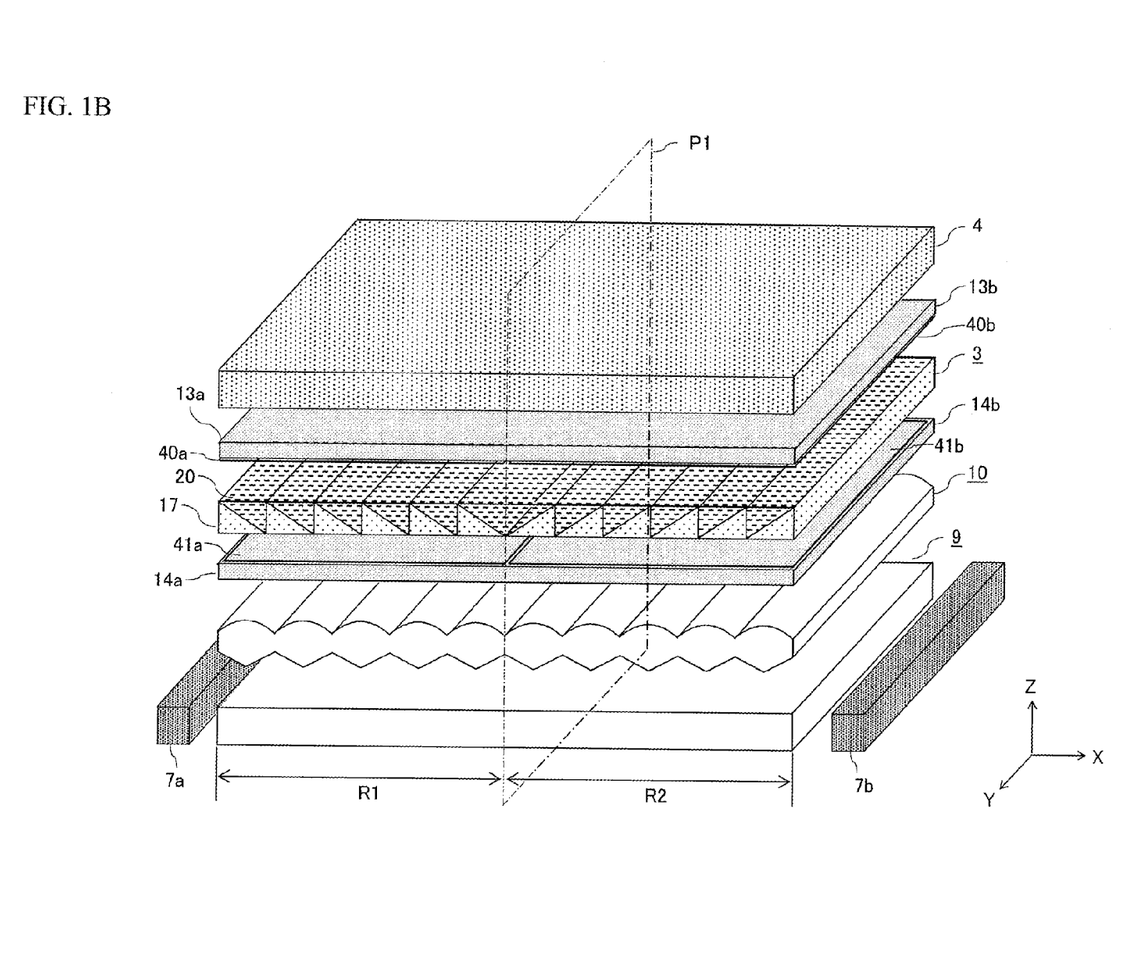
FIG. 1B is an exploded perspective view of a part of the image display apparatus shown in FIG. 1A.

FIG. 1A is a schematic cross-sectional view of an image display apparatus 1 according to the embodiment, and FIG. 1B is an exploded perspective view of a part of the image display apparatus 1 shown in FIG. 1A. In FIG. 1A, illustration of electrodes 40a, 40b, 41a, and 41b shown in FIG. 1B is omitted.

In the present embodiment, a three-dimensional orthogonal coordinate system is set for the image display apparatus 1, and a direction is specified by using coordinate axes. As shown in FIGS. 1A and 1B, an X axis direction coincides with a right-left direction (horizontal direction) when a user faces a display surface of an image display panel 4. A Y axis direction coincides with an up-down direction when the user faces the display surface of the image display panel 4. A Z axis direction coincides with a direction perpendicular to the display surface of the image display panel 4. Here, "facing" means that the user is present directly in front of the display surface such that, for example, when a letter of "A" is displayed on the display surface, the user sees the letter of "A" from a correct direction. In addition, FIGS. 1A and 1B correspond to views as seen from above the image display apparatus 1. Thus, the left side in FIGS. 1A and 1B corresponds to the right side of the display screen when a viewer sees the display screen.

The image display apparatus 1 includes a light source switching type backlight 2, a liquid crystal prism element 3, the image display panel 4 that displays an image for right eye and an image for left eye while alternately switching between the image for right eye and the image for left eye, a position detection section 38 that detects the position of a user who uses the image display apparatus 1, and a control section 6 that controls a liquid crystal driving voltage outputted to a liquid crystal prism element 3 on the basis of information of the detected position of the user. Hereinafter, each component will be described in detail.

<Detailed Configuration of Backlight 2>

The backlight 2 includes light sources 7a and 7b facing each other, a reflection film 8, a light guide plate 9, and a light control film 10. The reflection film 8 is provided on a lower surface side of the light guide plate 9, and the light control film 10 is provided on an upper surface side of the light guide plate 9.

The light sources 7a and 7b are arranged so as to extend along a pair of side surfaces, respectively, of the light guide plate 9, and face each other in the X axis direction. The light source 7a is located at the left side surface of the light guide plate 9, and the light source 7b is located at the right side surface of the light guide plate 9. Each of the light sources 7a and 7b has a plurality of LED elements arranged in the Y axis direction. Each of the light sources 7a and 7b alternately repeats lighting-up and going-out in synchronization with switching between the image for right eye and the eye image for left eye that are displayed on the image display panel 4. In other words, when the image display panel 4 displays the image for right eye, the light source 7a lights up and the light source 7b goes out, and when the image display panel 4 displays the image for left eye, the light source 7a goes out and the light source 7b lights up.

Light emitted from the light sources 7a and 7b spreads in the light guide plate 9 while being repeatedly totally reflected at the upper surface and the lower surface of the light guide plate 9. Light having an angle exceeding the total reflection angle within the light guide plate 9 is emitted from the upper surface of the light guide plate 9. The lower surface of the light guide plate 9 is composed of a plurality of inclined surfaces 35 as shown in FIGS. 1A and 1B. By these inclined surfaces 35, light propagating in the light guide plate 9 is reflected in various directions, and thus the intensity of the light emitted from the light guide plate 9 becomes uniform across the entire upper surface.

The reflection film 8 is provided on the lower surface side of the light guide plate 9. Light having an angle exceeding the total reflection angles of the inclined surfaces 35 provided in the lower surface of the light guide plate 9 is reflected by the reflection film 8, enters the light guide plate 9 again, and is eventually emitted from the upper surface. The light emitted from the light guide plate 9 is incident on the light control film 10.

On a lower surface of the light control film 10, a plurality of prisms 36 each having a triangular cross section and a ridge line extending in the Y axis direction are aligned along the X axis direction. In other words, on the lower surface of the light control film 10, the prisms 36 each having a triangular cross section are arranged in a one-dimensional array. In addition, on an upper surface of the light control film 10, a plurality of cylindrical lenses 37 extending in the Y axis direction are aligned along the X axis direction. In other words, a lenticular lens is formed on the upper surface of the light control film 10.

The light incident on the lower surface of the light control film 10 is refracted toward the Z axis direction by the prisms 36, converged by the lenticular lens located on the upper surface, and is incident on the liquid crystal prism element 3.

<Detailed Configuration of Liquid Crystal Prism Element 3>

Figure 2:
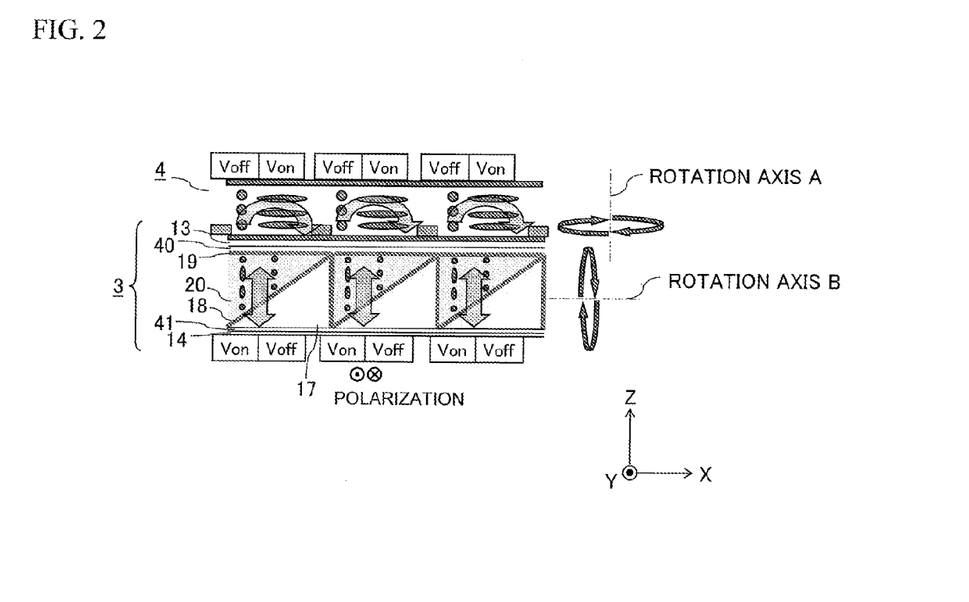
FIG. 2 is a diagram showing examples of configurations of a liquid crystal prism element and an image display panel according to the embodiment.

FIG. 2 is a diagram showing examples of configurations of the liquid crystal prism element and the image display panel according to the embodiment. Hereinafter, the liquid crystal prism element 3 will be described in detail with reference to FIGS. 1A and 1B and FIG. 2 in combination.

The liquid crystal prism element 3 controls the deflection direction such that light which is emitted from the left-side light source 7a and enters the prism element 3 via the light guide plate 9 and the light control film 10 is converged to the position of the right eye of the user. Further, the liquid crystal prism element 3 controls the deflection direction such that light which is emitted from the right-side light source 7b and enters the prism element 3 via the light guide plate 9 and the light control film 10 is converged to the position of the left eye of the user.

More specifically, the liquid crystal prism element 3 includes a pair of opposing substrates 13 and 14, a plurality of prisms 17 and a liquid crystal layer 20 sealed between the opposing substrates 13 and 14, electrodes 40a and 40b provided on an inner surface of the opposing substrate 13, and electrodes 41a and 41b provided on an inner surface of the opposing substrate 14.

Each of the prisms 17 has a triangular pole shape having a triangular cross section and a ridge line extending in the Y axis direction. As understood from FIGS. 1 and 2, the plurality of the prisms 17 are provided on the electrodes 41a and 41b so as to be aligned in the X axis direction. Cross-sectional shapes of the plurality of the prisms 17 are bilaterally symmetrical. For facilitating the explanation, the region where the prisms 17 are formed is divided into left and right halves in FIGS. 1A and 1B. The left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 4 is indicated by P1. The cross-sectional shape of the prisms 17 located in the region R1 and the cross-sectional shape of the prisms 17 located in the region R2 are designed so as to be symmetrical to each other about the plane P1 when seen on a plane parallel to an XZ plane, as shown in FIGS. 1A and 1B.

The electrode 40a is formed in the region R1 of the inner surface of the opposing substrate 13, and the electrode 40b is formed in the region R2 of the opposing substrate 13. Likewise, the electrode 41a formed in the region R1 of the inner surface of the opposing substrate 14, and the electrode 41b is formed in the region R2 of the inner surface of the opposing substrate 14.

Further, alignment films 18 and 19 that are subjected to orientation treatment for controlling the orientation directions of liquid crystal molecules into a desired direction are provided on the surfaces of the prisms 17 and the electrodes 40a and 40b. The alignment films 18 and 19 orient the liquid crystal molecules such that the long axes of the liquid crystal molecules extend in the Y axis direction in a state where no voltage is applied to the electrodes 40a, 40b, 41a, and 41b. The alignment films 18 and 19 may be omitted as long as the orientation of the liquid crystal molecules is kept uniform.

As the materials of the opposing substrates 13 and 14 and the prisms 17, glass or resin can be used. The prisms 17 can be formed by, for example, imprinting a UV-curing resin on a glass substrate. The liquid crystal prism element 3 can be produced by forming a one-dimensional array of the prisms 17 on the opposing substrate 14 on which the electrodes 41a and 41b have been formed, then attaching together the opposing substrate 14 and the opposing substrate 13 on which the electrodes 40a and 40b have been formed, and injecting a liquid crystal between the opposing substrates 13 and 14.

The liquid crystal prism element 3 is an element that can control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 20 has a birefringence property in which a refractive index is different for each polarization direction of incident light. In addition, when the direction of the orientation (director) of each liquid crystal molecule changes with respect to the polarization direction of light, the refractive index of the liquid crystal layer 20 also changes. Thus, when the orientation of the liquid crystal is changed by an electric field generated by applying a certain voltage, the refractive index for transmitted light changes, and thus a deflection angle which is a refraction angle of the light changes.

In general, in the case where light is deflected by an active element such as the liquid crystal prism element 3, it is desirable to use a liquid crystal material having high $\Delta n$ (=refractive index no for ordinary light−refractive index ne for extraordinary light) in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed or the like. In the present disclosure, optimum initial orientation of liquid crystal and an optimum orientation rotation direction are derived by simulation.

In FIG. 2, the orientation (Von) of the liquid crystal molecules in the case where a voltage is applied to the liquid crystal prism element 3 and the initial orientation (Voff) of the liquid crystal molecules in the case where no voltage is applied thereto, are schematically shown side by side. The initial orientation direction in the case where no voltage is applied is the Y axis direction. On the other hand, when a voltage is applied, the liquid crystal molecules are aligned in the X axis direction. In this way, in the liquid crystal prism element 3 according to the present embodiment, an orientation rotation axis B around which the orientation of the liquid crystal molecules in the liquid crystal layer 20 is changed is parallel to the X axis, that is, parallel to the display surface of the image display panel 4, and is parallel to one side, in the right-left direction, of the image display panel 4. However, since the alignment film 19 is provided on the inclined surfaces of the prisms 17 and the alignment film 18 is provided on the electrodes 40a and 40b, the orientation of the liquid crystal molecules in the vicinity of the alignment films 18 and 19 is not changed even when a voltage is applied.

In the liquid crystal prism element 3, the inclination direction of each inclined surface of each prism 17 is different between the right and left sides of the center line of the screen (the plane P1). The liquid crystal prism element 3 has a property in which the efficiency of deflection toward a direction (upper-right direction in FIG. 2) in which the emitted light gets close to the inclined surface of each prism 17 is lower than the efficiency of deflection in a direction (upper-left direction in FIG. 2) in which the emitted light becomes more distant from the inclined surface of each prism 17. Thus, when the inclined surfaces of the prisms 17 are made symmetrical about the plane P1 and are also made to face ahead of the center portion of the screen, the liquid crystal prism element 3 is able to efficiently deflect light incident near the left edge of the screen, toward ahead of the screen on the right, and is able to efficiently deflect light incident near the right edge of the screen, toward ahead of the screen on the left. In this case, different voltages are applied to the left and right regions of the liquid crystal prism element 3. Thus, the electrodes 40a and 40b and the electrodes 41a and 41b are separated at the center of the screen.

Light transmitted through the liquid crystal prism element 3 is incident on the image display panel 4. Although FIG. 2 shows the in-plane-switching type image display panel 4 in which the liquid crystal molecules rotate about a rotation axis A according to the applied voltage, another type of image display panel may be adopted. Light transmitted through the image display panel 4 has directivity and is converged at the position of an eye of the viewer.

The image display apparatus 1 switches between the light sources 7a and 7b in synchronization with switching between the image for right eye and the image for left eye. In addition, when the switching between the image for right eye and the image for left eye is performed at a frequency equal to or higher than 120 Hz, the user can recognize a stereoscopic image, on the basis of the image for right eye and the image for left eye.

<Detailed Configuration of Position Detection Section 38>

The position detection section 38 includes a camera 5 and a viewing position calculation section 39. The camera 5 takes an image of the user in predetermined cycles. The viewing position calculation section 39 analyzes the image taken by the camera 5, and calculates viewing position information representing a viewing position of the user. For the image analysis performed by the camera 5, a known algorithm for recognizing the position of a face or a portion (eyes, nose, etc.) of a face can be used. In addition, the viewing position information calculated by the viewing position calculation section 39 preferably represents the positions of the eyes of the user, but may represent the position of the face, the nose, or the like instead of the positions of the eyes.

The control section 6 controls the value of a voltage applied to the liquid crystal prism element 3, on the basis of the viewing position information calculated by the viewing position calculation section 39. More specifically, when the viewing position of the user shifts from a position in front of the screen center to the right side of the screen as shown in FIG. 1A, the light emitted from each prism 17 is deflected in the right direction as seen from the user by decreasing the applied voltage to make the refractive index of the liquid crystal layer 20 lower than the refractive index of each prism 17. At this time, the deflection angle in the region R1 and the deflection angle in the region R2 can be adjusted by making the voltage applied to the region R1 lower than the voltage applied to the region R2. In contrast, when the viewing position of the user shifts from the position in front of the screen center to the left side of the screen as shown in FIG. 1A, the light emitted from each prism 17 is deflected in the left direction as seen from the user by increasing the applied voltage to make the refractive index of the liquid crystal layer 20 higher than the refractive index of each prism 17. At this time, the deflection angle in the region R1 and the deflection angle in the region R2 can be adjusted by making the voltage applied to the region R2 higher than the voltage applied to the region R1.

The deflection angle of the liquid crystal prism element 3 and position information of a converged point of light can be assumed at the stage of designing, and thus it suffices to previously prepare data that associates an applied voltage with position information and to store the data in a storage unit provided in the image display apparatus 1. In addition, after completion of a product, calibration may be performed to correct the position of a light converged point.

By repeating the above-described deflection control based on the viewing position information in predetermined cycles, it is made possible for the viewer to view a stereoscopic image at an arbitrary location even when the viewer freely moves relative to the image display apparatus 1. Thus, according to the present disclosure, an image display apparatus having a wide view range can be realized. In addition, by converging light at the position of an eye of the viewer, a high-brightness and energy-saving image display apparatus 1 can be realized.

<Modifications>

In the present embodiment, the light guide plate 9 is shared by the light sources 7a and 7b. However, a light guide plate for the light source 7a and a light guide plate for the light source 7b may be provided so as to be laminated on each other.

In addition, instead of the control film 10 in which the prisms and the lenticular lens are integrated, a prism sheet and a lenticular lens sheet may be individually provided.

Furthermore, the backlight 2 is not limited to have the configuration shown in FIGS. 1A and 1B, and may have another configuration as long as it is able to alternately emit light for right eye and light for left eye in a time division manner in synchronization with switching between right and left image signals.

Furthermore, in the present embodiment, the directions of the inclined surfaces of the prisms 17 in the liquid crystal prism element 3 are made different between the regions R1 and R2, and the inclined surfaces of the prisms 17 are formed so as to be symmetrical about the plane P1. However, the directions of the inclined surfaces of the prisms may be uniform in the entire liquid crystal prism element 3. In this case, instead of providing the separate electrodes in the regions R1 and R2 of the liquid crystal prism element 3 as in the present embodiment, a single electrode is provided over the entire display screen. However, it is more preferred to provide the prisms 17 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 7a and 7b are constantly lit up instead of being alternately lit up. As well as in the case of displaying a three-dimensional image, also when a two-dimensional image is displayed, the displayed content can be prevented from being seen by surrounding people and thus privacy protection can also be improved, in addition to energy saving, by following movement of the viewer and projecting an image only on the eyes of the viewer and the vicinity thereof in a reduced range.

Furthermore, in the present embodiment, the prisms 17 in the liquid crystal prism element 3 are used as a first optical element which is disposed between the image display panel and the backlight device and deflects incident light, and a liquid crystal element in the liquid crystal prism element is used as a second optical element which is disposed between the image display panel and the backlight device, and changes the deflection direction of emitted light by changing the refractive index thereof according to a voltage applied thereto. However, the optical element such as the prisms 17 and the liquid crystal element are not necessarily integrated as a liquid crystal prism element, and may be separately provided. In addition, the first optical element is not necessarily prisms, and may be a lenticular lens or a liquid crystal element.

EXAMPLES

Example 1

Figure 3:
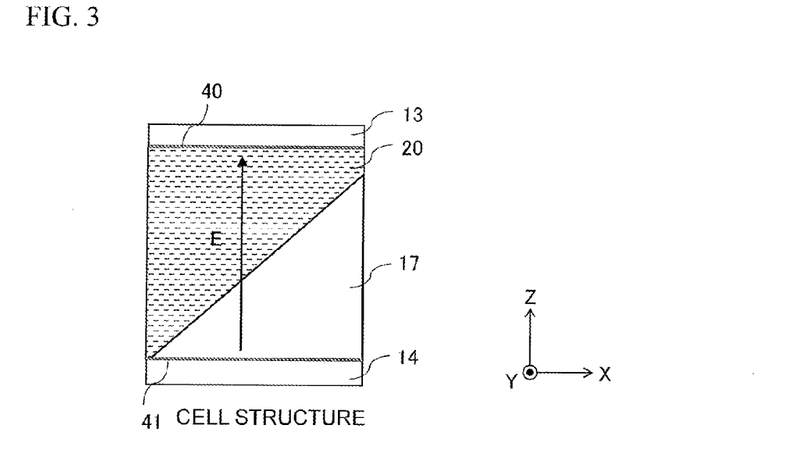
FIG. 3 is a diagram showing a configuration of a liquid crystal prism element according to Example 1.

FIG. 3 is a diagram showing a configuration of a liquid crystal prism element according to Example 1. In the liquid crystal prism element 3 according to Example 1, electrodes 40 and 41 are formed on the inner surfaces of opposing substrates 13 and 14, respectively, and an electric field E is generated in the thickness direction when a voltage is applied.

Figure 4:
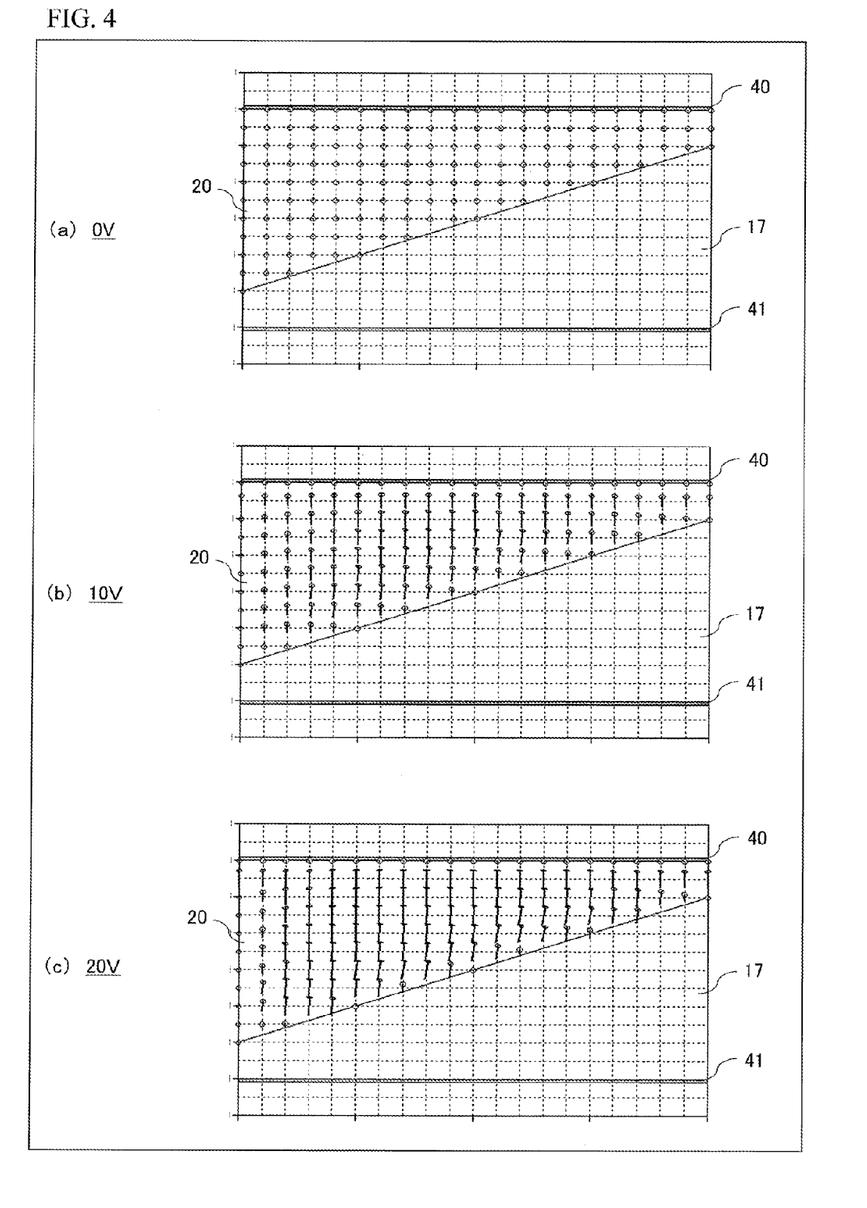
FIG. 4 is a diagram showing calculation results of directors relating to the liquid crystal prism element according to Example 1.

FIG. 4 is a diagram showing the calculation results of directors relating to the liquid crystal prism element shown in FIG. 3. More specifically, FIGS. 4(a), 4(b), and 4(c) show the orientation distributions (directors) of liquid crystal molecules when the applied voltage is 0 V, 10 V, and 20 V, respectively.

As shown in FIG. 4(a), in the state where the applied voltage is 0 V, i.e., in the initial state, the liquid crystal molecules are oriented in the direction perpendicular to the sheet plane of FIG. 4 (the Y axis direction in FIG. 3). When a voltage of 10 V or 20 V is applied, the liquid crystal molecules are rotated and the orientation state thereof is changed as shown in FIGS. 4(b) and 4(c), respectively. In the state shown in FIG. 4(c), the orientation of the liquid crystal molecules can be changed in the wider range of the liquid crystal layer 20 as compared to the state shown in FIG. 4(b). Accordingly, the greater the applied voltage is, the larger the refractive index with respect to the transmitted light can be, resulting in an increased deflection angle.

Comparative Example 1

Figure 5:
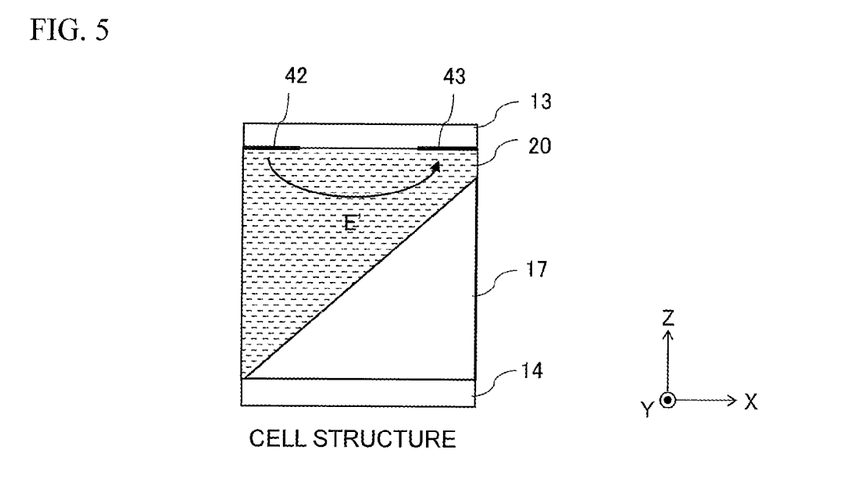
FIG. 5 is a diagram showing a configuration of a liquid crystal prism element according to Comparative Example 1.

FIG. 5 is a diagram showing a configuration of a liquid crystal prism element according to Comparative Example 1. The liquid crystal prism element according to Comparative Example 1 includes the same opposing substrates 13 and 14, prism 17, and liquid crystal layer 20 as those of Example 1, but is different from Example 1 in that a pair of electrodes 42 and 43 is formed on the inner surface of the substrate 13 and an electric field E' is generated in the direction parallel to the surface of the liquid crystal prism element (the right-left direction in FIG. 5) when a voltage is applied.

Figure 6:
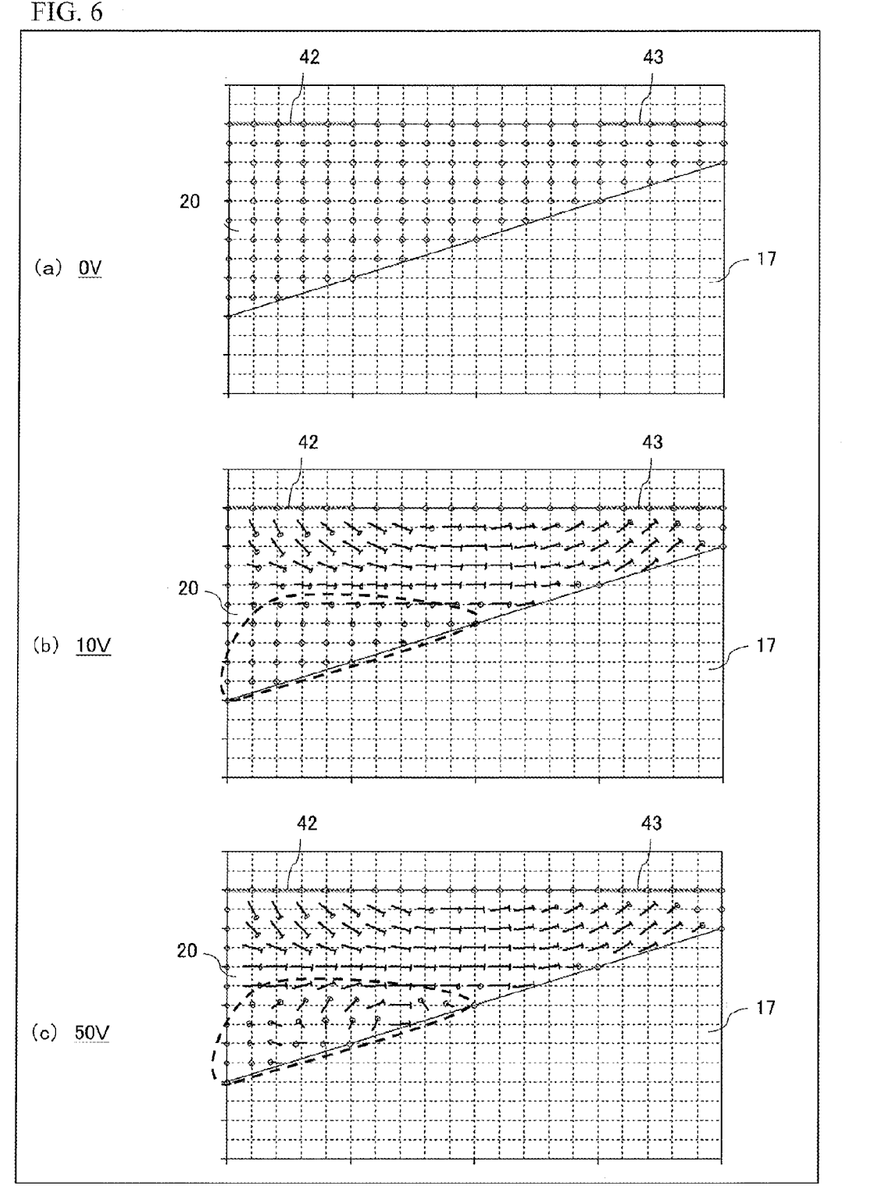
FIG. 6 is a diagram showing calculation results of directors relating to the liquid crystal prism element according to Comparative Example 1.

FIG. 6 is a diagram showing the calculation results of directors relating to the liquid crystal prism element according to Comparative Example 1. More specifically, FIGS. 6(a), 6(b), and 6(c) show the orientation distributions (directors) of liquid crystal molecules when the applied voltage is 0 V, 10 V, and 50 V, respectively.

Like in Example 1, in the state where the applied voltage is 0 V, i.e., in the initial state, the liquid crystal molecules are oriented in the direction perpendicular to the sheet plane (the Y axis direction in FIG. 5) as shown in FIG. 6(a). When a voltage of 10 V or 50 V is applied, the liquid crystal molecules are rotated and the orientation thereof is changed as shown in FIGS. 6(b) and 6(c), respectively. At this time, the liquid crystal molecules are oriented such that the long axes thereof extend along the direction of the electric field E'. However, since a sufficient electric field is not generated in a part of the liquid crystal layer 20 (a part enclosed by a broken line) distant from the electrode, the orientation of the liquid crystal is not sufficiently changed in this part. Accordingly, in the configuration of Comparative Example 1 shown in FIG. 5, it is difficult to increase the change in the refractive index of the liquid crystal layer, and therefore, the deflection angle cannot be increased.

Example 2

Figure 7:
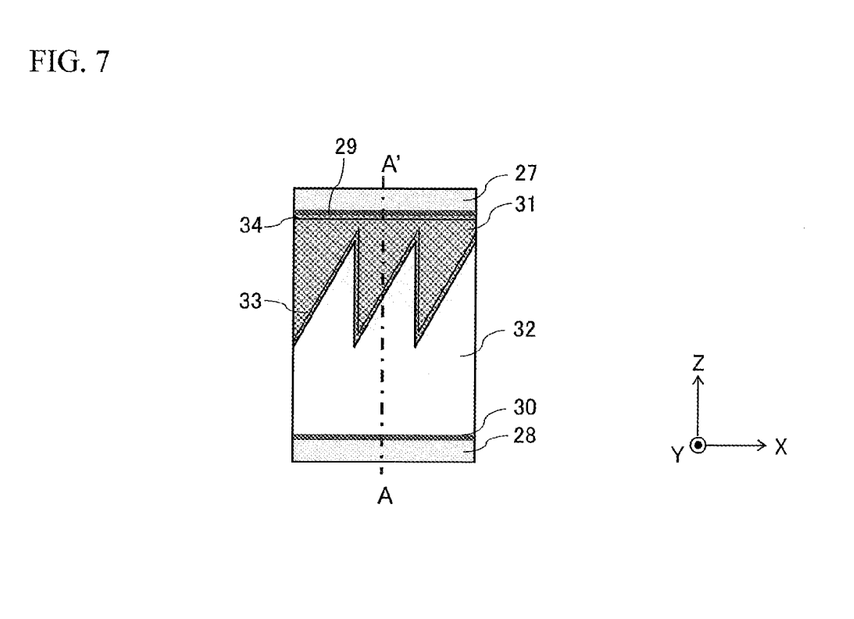
FIG. 7 is a diagram showing a configuration of a liquid crystal prism element according to Example 2.

FIG. 7 is a diagram showing a configuration of a liquid crystal prism element according to Example 2. The liquid crystal prism element shown in FIG. 7 includes opposing substrates 27 and 28, an electrode 29 provided on the inner surface of the opposing substrate 27, an electrode 30 provided on the inner surface of the opposing substrate 28, prisms 32 formed on the electrode 30, a liquid crystal layer 31 sealed between the prisms 32 and the opposing substrate 27, an alignment film 33 provided over the surfaces of the prisms 32, and an alignment film 34 provided on the surface of the electrode 29.

Figure 8:
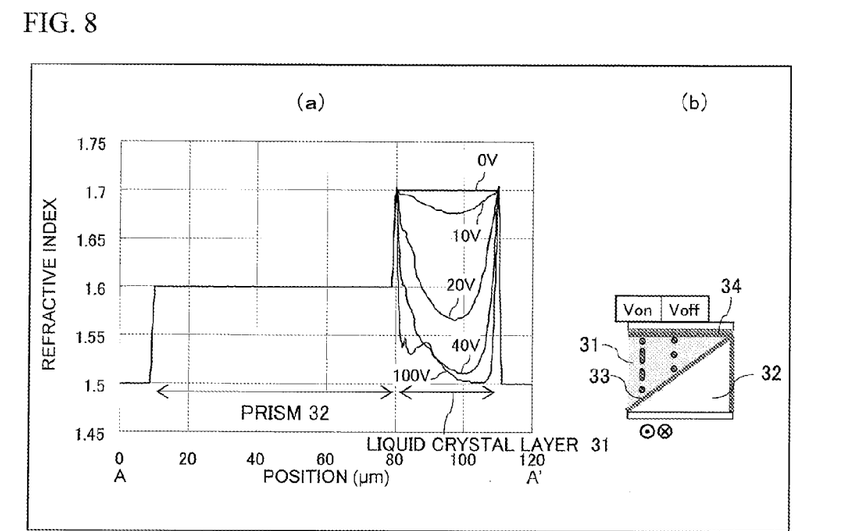
FIG. 8 is a diagram showing calculation results of refractive indices relating to the liquid crystal prism element according to Example 2.

FIG. 8 is a diagram showing the calculation results of refractive indices relating to the configuration of the liquid crystal prism element according to Example 2. More specifically, FIG. 8(a) shows the result of simulation in which the relationship between the position on a line A-A' in FIG. 7 and the refractive index of the liquid crystal layer at the corresponding position is simulated at different voltages, and FIG. 8(b) shows the orientation directions of the liquid crystal molecules, represented in the same manner as in FIG. 2.

In Example 2, as shown in FIG. 8(b), the alignment films 33 and 34 are subjected to orientation treatment such that the liquid crystal molecules are oriented in a direction that is parallel to both the opposing substrate 27 and the inclined surface of each prism 32 and that is perpendicular to the sheet plane in the initial state where the applied voltage is 0 V.

As shown in FIG. 8(a), the material refractive index of the prism 32 is 1.6, and the refractive index of the liquid crystal layer is changed according to the applied voltage. When the applied voltage is 0 V and 100 V, the difference between the material refractive index of the prism 32 and the refractive index of the liquid crystal layer is increased, and the deflection angle with respect to the transmitted light can be increased.

Comparative Examples 2 and 3

Figure 9:
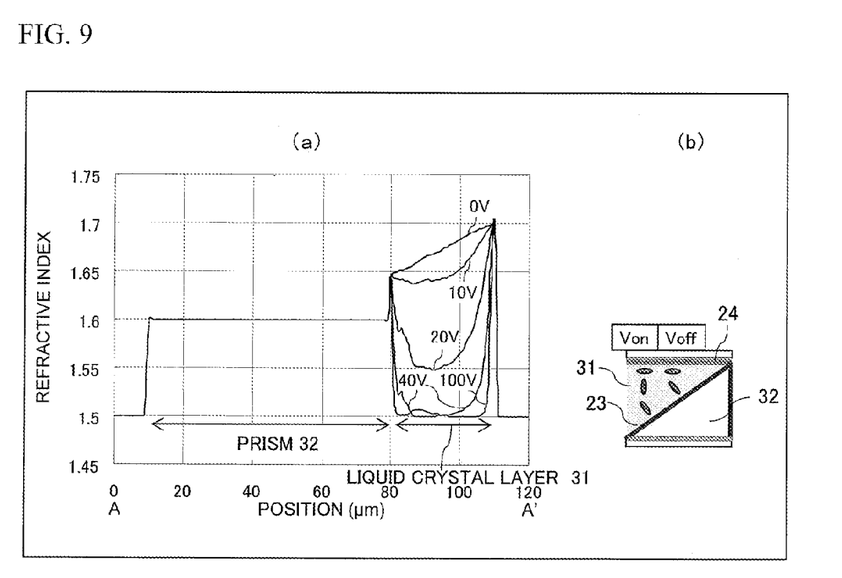
FIG. 9 is a diagram showing calculation results of refractive indices relating to a liquid crystal prism element according to Comparative Example 2.
Figure 10:
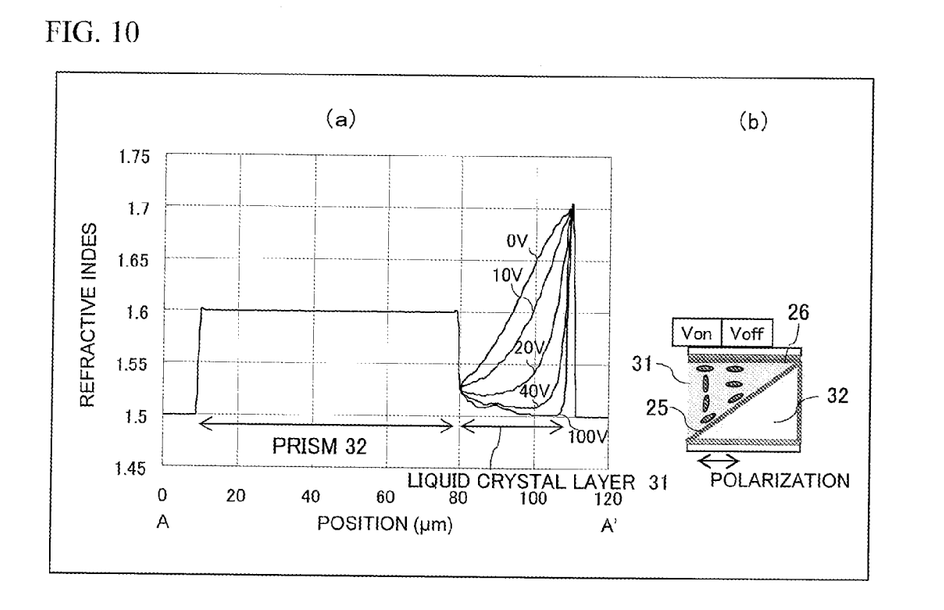
FIG. 10 is a diagram showing calculation results of refractive indices relating to a liquid crystal prism element according to Comparative Example 3.

FIGS. 9 and 10 are diagrams showing the calculation results of refractive indices relating to the configurations of liquid crystal prism elements according to Comparative Examples 2 and 3, respectively. More specifically, FIGS. 9(a) and 10(a) each show the result of simulation in which the relationship between the position on the line A-A' in FIG. 7 and the refractive index of the liquid crystal layer at the corresponding position is simulated at different voltages, and FIGS. 9(b) and 10(b) each show the orientation directions of the liquid crystal molecules, represented in the same manner as in FIG. 2.

The configuration of the liquid crystal prism element according to Comparative Example 2 is basically identical to that of Example 2 shown in FIG. 7, but is different from Example 2 in that alignment films 23 and 24 are provided instead of the alignment films 33 and 34. Specifically, as shown in FIG. 9(b), the alignment film 24 orients the liquid crystal molecules in a direction parallel to the opposing substrate 27 and parallel to the right-left direction of the sheet plane. The alignment film 23 orients the liquid crystal molecules in a direction perpendicular to the inclined surface of the prism 32.

As shown in FIG. 9(a), in the initial state where the applied voltage is 0 V, the refractive index of the liquid crystal layer in the vicinity of the inclined surface of the prism 32 is about 1.65, while the refractive index of the liquid crystal layer in the vicinity of the opposing substrate 27 is about 1.7. Accordingly, the deflection angle due to the liquid crystal layer 31 when the applied voltage is 0 V is smaller than that in Example 2.

The configuration of the liquid crystal prism element according to Comparative Example 3 is basically identical to that of Example 2 shown in FIG. 7, but is different from Example 2 in that alignment films 25 and 26 are provided instead of the alignment films 33 and 34. Specifically, as shown in FIG. 10(b), the alignment film 26 orients the liquid crystal molecules in a direction parallel to the opposing substrate 27 and parallel to the right-left direction of the sheet plane. The alignment film 25 orients the liquid crystal molecules in a direction parallel to the inclined surface of the prism 32 and parallel to the sheet plane.

As shown in FIG. 10(a), in the initial state where the applied voltage is 0 V, the refractive index of the liquid crystal layer in the vicinity of the inclined surface of the prism 32 is about 1.525, while the refractive index of the liquid crystal layer in the vicinity of the opposing substrate 27 is about 1.7. Accordingly, the deflection angle due to the liquid crystal layer 31 when the applied voltage is 0 V is smaller than that in Example 2.

Based on the comparison between Example 2 and Comparative Examples 2 and 3, it is confirmed that the largest deflection angle can be obtained when, in the initial state where the applied voltage is 0 V, the liquid crystal molecules are oriented in the ridge direction of the liquid crystal prism (the Y axis direction in FIG. 7) and the orientation rotation axis is caused to be orthogonal to the ridge line of the prism 32.

The present disclosure is applicable to a high-brightness, high-efficiency, and high-resolution image display apparatus. In addition, the present disclosure is widely applicable not only to use of displaying a three-dimensional image but also to use of displaying a two-dimensional image. Specifically, the present disclosure is applicable to a 3D liquid crystal display apparatus, a privacy display, and the like.

The embodiment and Examples have been described above as illustrative examples of the technology in the present disclosure. For that, the accompanying drawings and the detailed description have been provided.

Therefore, the constituent elements described in the accompanying drawings and the detailed description may include not only constituent elements essential for solving the problems but also constituent elements non-essential for solving the problems, in order to illustrate the technology described above. Thus, these non-essential constituent elements should not be readily recognized as being essential, due to these non-essential constituent elements being described in the accompanying drawings and the detailed description.

Furthermore, since the embodiment described above is intended to illustrate the technology in the present disclosure, various changes, substitutions, additions, omissions, and the like can be made within the scope of the claims and the scope of equivalents thereof.

What is claimed is:

1. An image display apparatus comprising:
   an image display panel;
   a backlight device located on a back surface side of the image display panel;
   a first optical element located between the image display panel and the backlight device and configured to deflect incident light;
   a second optical element located between the image display panel and the backlight device and configured to change a deflection direction of emitted light by changing a refractive index thereof according to a voltage applied thereto;
   a position detection section configured to detect a position of a user; and
   a control section configured to control the voltage applied to the second optical element, on the basis of information of the position of the user detected by the position detection section, wherein:
   the first optical element and the second optical element constitute a liquid crystal prism element,
   in the liquid crystal prism element, the first optical element is composed of a plurality of prisms each having a triangular cross section and a ridge line extending in a first direction parallel to one side of the image display panel, the prisms being arranged between a pair of opposing substrates so as to be aligned in a second direction orthogonal to the first direction,
   in the liquid crystal prism element, the second optical element is composed of a liquid crystal element which includes a liquid crystal layer formed between the plurality of the prisms and one of the opposing substrates, and electrodes provided on inner surfaces of the opposing substrates, and is configured to generate an electric field in a thickness direction thereof when a voltage is applied,
   an entire planar region of the liquid crystal prism element is divided into a first region and a second region which are adjacent to each other in the second direction, and the cross sectional shape of each prism provided in the first region and the cross sectional shape of each prism provided in the second region are symmetrical to each other about a plane that is orthogonal to a display surface of the image display panel and passes through a boundary between the first region and the second region,
   the first region of the entire planar region of the liquid crystal prism is configured to adjust left-eye light to one viewer, and
   the second region of the entire planar region of the liquid crystal prism is configured to adjust right-eye light to the one viewer.

2. The image display apparatus according to claim 1, wherein the backlight device includes:
   a light guide plate having a pair of side surfaces and configured to guide light incident on the side surfaces, to an exit surface;
   a first light source located so as to face one of the side surfaces; and
   a second light source located so as to face the other of the side surfaces.

3. The image display apparatus according to claim 2, wherein
   an image signal for right eye and an image signal for left eye to which a parallax is provided are alternately inputted into the image display panel in a time division manner,
   the first light source emits the right-eye light for displaying an image for right eye,
   the second light source emits the left-eye light for displaying an image for left eye, and
   the first light source and the second light source alternately light up in synchronization with switching between the image signal for right eye and the image signal for left eye.

4. The image display apparatus according to claim 1, wherein:
   each of the plurality of prisms of the first optical element has a triangular cross section having a first line, a second line and a third line,
   the first line faces the second optical element and the third line faces the back light device,
   the first line is longer than the third line and the third line is longer than the second line, and
   all surfaces, each defined by the first line, of the plurality of prisms face the plane.

5. An image display apparatus comprising:
   an image display panel;
   a backlight device located on a back surface side of the image display panel;
   a first optical element located between the image display panel and the backlight device and configured to deflect incident light;
   a second optical element located between the image display panel and the backlight device and configured to change a deflection direction of emitted light by changing a refractive index thereof according to a voltage applied thereto;
   a position detection section configured to detect a position of a user; and
   a control section configured to control the voltage applied to the second optical element, on the basis of information of the position of the user detected by the position detection section, wherein:
   the first optical element and the second optical element constitute a liquid crystal prism element,
   in the liquid crystal prism element, the first optical element is composed of a plurality of prisms each having a triangular cross section and a ridge line extending in a first direction parallel to one side of the image display panel, the prisms being arranged between a pair of opposing substrates so as to be aligned in a second direction orthogonal to the first direction,
   in the liquid crystal prism element, the second optical element is composed of a liquid crystal element which includes a liquid crystal layer formed between the plurality of the prisms and one of the opposing substrates, and electrodes provided on inner surfaces of the opposing substrates, and is configured to generate an electric field in a thickness direction thereof when a voltage is applied, and
   an entire planar region of the liquid crystal prism element is divided into a first region and a second region which are adjacent to each other in the second direction, and the cross sectional shape of each prism provided in the first region and the cross sectional shape of each prism provided in the second region are symmetrical to each other about a plane that is orthogonal to a display surface of the image display panel and passes through a boundary between the first region and the second region, the image display panel has a rectangular shape, shorter sides of which extend in the first direction, a first longer side of which extends in the second direction, and a second longer side of which extends in the second direction, and the plane passes through a first midpoint of the first longer side of the rectangular shape of the image display panel and a second midpoint of the second longer side of the rectangular shape of the image display panel.

6. The image display apparatus according to claim 5, wherein the backlight device includes:
a light guide plate having a pair of side surfaces and configured to guide light incident on the side surfaces, to an exit surface;
a first light source located so as to face one of the side surfaces; and
a second light source located so as to face the other of the side surfaces.

7. The image display apparatus according to claim 6, wherein:
an image signal for right eye and an image signal for left eye to which a parallax is provided are alternately inputted into the image display panel in a time division manner,
the first light source emits illumination light for displaying an image for right eye,
the second light source emits illumination light for displaying an image for left eye, and
the first light source and the second light source alternately light up in synchronization with switching between the image signal for right eye and the image signal for left eye.

8. The image display apparatus according to claim 5, wherein:
each of the plurality of prisms of the first optical element has a triangular cross section having a first line, a second line and a third line,
the first line faces the second optical element and the third line faces the back light device,
the first line is longer than the third line and the third line is longer than the second line, and
all surfaces, each defined by the first line, of the plurality of prisms face the plane.

9. The image display apparatus according to claim 5, wherein:
the liquid crystal layer in the first region comprises a first liquid crystal,
the liquid crystal layer in the second region comprises a second liquid crystal,
a first refractive index of the first liquid crystal is valuable, and
a second refractive index of the second liquid crystal is valuable.

10. The image display apparatus according to claim 9, wherein
the first refractive index of the first liquid crystal and the second refractive index of the second liquid crystal are capable to be changed separately.

11. The image display apparatus according to claim 9, wherein:
the first refractive index of the first liquid crystal is capable to be changed by a first electric field applying to the first liquid crystal, and
the second refractive index of the first liquid crystal is capable to be changed by a second electric field applying to the second liquid crystal.

12. The image display apparatus according to claim 11, wherein:
the electrodes provided on inner surfaces of the opposing substrates, comprises a first pair of electrodes in the first region and a second pair of electrodes in the second region,
the first pair of electrodes in the first region are applied a first voltage,
the second pair of electrodes in the second region are applied a second voltage, and
the first voltage and the second voltage are changed separately by the control section.

13. An image display apparatus comprising:
an image display panel having a rectangular shape having a first longer side extending in a longer side direction, a second longer side extending in the longer side direction, shorter sides extending in a shorter side direction perpendicular to the longer side direction, a first surface and a second surface opposing to the first surface, and configured to display an image;
a light device located on the first surface side of the image display panel, and configured to emit light to the first surface of the image display panel;
first triangular prisms which have ridge lines, each of the ridge lines extending in the shorter side direction of the rectangular shape of the image display panel and protruding towards the image display panel, the first triangular prisms being arranged along the longer side direction of the rectangular shape of the image display panel, a cross sectional shape of each of the first triangular prisms being a triangle shape having a first line, a second line, and third line which is longer than the first line and the second line;
a first liquid crystal layer comprising first liquid crystal, overlapping the first triangular prisms, and located between the first triangular prisms and the first surface side of the image display panel;
second triangular prisms which have ridge lines, each of the ridge lines extending in the shorter side direction of the rectangular shape of the image display panel and protruding towards the image display panel, the second triangular prisms being arranged along the longer side direction of the rectangular shape of the image display panel, a cross sectional shape of each of the second triangular prisms being a triangle shape having a first line, a second line, and third line which is longer than the first line and the second line; and
a second liquid crystal layer comprising second liquid crystal, overlapping the second triangular prisms, and located between the second triangular prisms and the first surface side of the image display panel, wherein:
the light is deflected between a surface defined by the third line of the cross sectional shape of the each of the first triangular prisms, and the first surface of the image display panel,
the light is deflected between a surface defined by the third line of the cross sectional shape of the each of the second triangular prisms, and the first surface of the image display panel,
the first triangular prisms and the second triangular prisms are adjacent to each other in the longer side direction of the rectangular shape of the image display panel, and
the surface defined by the third line of the cross sectional shape of the each of the first triangular prisms and the surface defined by the third line of the cross sectional shape of the each of the second triangular prisms are symmetrical to each other about a plane that is orthogonal to the image display panel and passes through a first midpoint of the first longer side of the rectangular shape of the image display panel and a second midpoint of the second longer side of the rectangular shape of the image display panel.

14. The image display apparatus according to claim 13, wherein:
    the surface defined by the third line of the cross sectional shape of the each of the first triangular prisms and a surface defined by the second line of the cross sectional shape of the each of the first triangular prisms form each of the ridge lines of the first triangular prisms, and
    the surface defined by the third line of the cross sectional shape of the each of the second triangular prisms and a surface defined by the second line of the cross sectional shape of the each of the second triangular prisms form each of the ridge lines of the second triangular prisms.

15. The image display apparatus according to claim 13, wherein
    the surface defined by the third line of the cross sectional shape of the each of the first triangular prisms and the surface defined by the third line of the cross sectional shape of the each of the second triangular prisms face each other.

16. The image display apparatus according to claim 13, wherein:
    the light emitted by the light device is deflected between the surface defined by the third line of the cross sectional shape of the each of the first triangular prisms, and the first liquid crystal, and
    the light emitted by the light device is deflected between the surface defined by the third line of the cross sectional shape of the each of the second triangular prisms, and the second liquid crystal.

17. The image display apparatus according to claim 13, wherein:
    the light emitted by the light device is deflected in the first liquid crystal layer, and
    the light emitted by the light device is deflected in the second liquid crystal layer.

18. The image display apparatus according to claim 13, wherein
    a first refractive index of the first liquid crystal and a second refractive index of the second liquid crystal are capable to be changed separately.

19. The image display apparatus according to claim 18, wherein:
    the first refractive index of the first liquid crystal is capable to be changed by a first electric field applying to the first liquid crystal, and
    the second refractive index of the first liquid crystal is capable to be changed by a second electric field applying to the second liquid crystal.

20. The image display apparatus according to claim 18, further comprises
    a position detector configured to detect a user position of a user watching the image on the image display panel, in the longer side direction of the rectangular shape of the image display panel,
    wherein when the user position detected by the position detector moves along the longer side direction of the rectangular shape of the image display panel, the first refractive index of the first liquid crystal and the second refractive index of the second liquid crystal are changed separately.

* * * * *